United States Patent
Agrawal et al.

(10) Patent No.: US 10,591,969 B2
(45) Date of Patent: Mar. 17, 2020

(54) SENSOR-BASED NEAR-FIELD COMMUNICATION AUTHENTICATION

(71) Applicant: Google Technology Holdings LLC, Mountain View, CA (US)

(72) Inventors: Jagadish Kumar Agrawal, Santa Clara, CA (US); Deepak Chandra, Mountain View, CA (US); John J. Gorsica, Round Lake, IL (US); Jagatkumar V. Shah, Lake In The Hills, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 519 days.

(21) Appl. No.: 14/312,813

(22) Filed: Jun. 24, 2014

(65) Prior Publication Data
US 2015/0121108 A1   Apr. 30, 2015

Related U.S. Application Data

(60) Provisional application No. 61/895,670, filed on Oct. 25, 2013.

(51) Int. Cl.
*G06F 1/3206* (2019.01)
*H04W 4/80* (2018.01)
(Continued)

(52) U.S. Cl.
CPC .......... *G06F 1/3206* (2013.01); *G06F 1/3293* (2013.01); *G06F 21/35* (2013.01);
(Continued)

(58) Field of Classification Search
CPC ....... G06F 1/3206; G06F 1/3293; G06F 21/35
See application file for complete search history.

(56) References Cited

U.S. PATENT DOCUMENTS

| | | | |
|---|---|---|---|
| 5,225,618 A * | 7/1993 | Wadhams | G09B 15/00 84/462 |
| 7,507,944 B1 | 3/2009 | Arnzen et al. | |

(Continued)

FOREIGN PATENT DOCUMENTS

| | | |
|---|---|---|
| CN | 101123498 | 2/2008 |
| CN | 102117420 | 7/2011 |

(Continued)

OTHER PUBLICATIONS

"International Search Report and Written Opinion", Application No. PCT/US2014/047313, dated Nov. 4, 2014, 11 pages.

(Continued)

*Primary Examiner* — Austin Hicks
(74) *Attorney, Agent, or Firm* — Colby Nipper PLLC (57) ABSTRACT

This document describes techniques (400, 500, 600) and apparatuses (100, 700) for implementing sensor-based near-field communication (NFC) authentication. These techniques (400, 500, 600) and apparatuses (100, 700) enable a computing device (102) to detect, in a low-power state, environmental variances indicating proximity with an NFC-enabled device (104) with which to authenticate. In some embodiments, various components of a computing device (102) in a sleep state are activated to process environmental variance(s), perform authentication operations, and/or an indicate initiation of authentication operations to a user.

20 Claims, 7 Drawing Sheets

(51) Int. Cl.
*G06F 1/3293* (2019.01)
*H04L 29/06* (2006.01)
*G06F 21/35* (2013.01)
*H04W 12/06* (2009.01)
*H04W 52/02* (2009.01)
*G06F 21/44* (2013.01)
*H04L 29/08* (2006.01)
*H04W 12/00* (2009.01)

(52) U.S. Cl.
CPC .......... *G06F 21/44* (2013.01); *H04L 63/0853* (2013.01); *H04L 63/107* (2013.01); *H04W 4/80* (2018.02); *H04W 12/06* (2013.01); *H04W 52/0293* (2013.01); *H04L 63/0492* (2013.01); *H04L 67/04* (2013.01); *H04W 12/00503* (2019.01); *H04W 12/00504* (2019.01); *Y02D 10/122* (2018.01); *Y02D 70/142* (2018.01); *Y02D 70/144* (2018.01); *Y02D 70/146* (2018.01); *Y02D 70/166* (2018.01); *Y02D 70/22* (2018.01); *Y02D 70/26* (2018.01)

(56) References Cited

U.S. PATENT DOCUMENTS

| | | | |
|---|---|---|---|
| 9,007,391 B2 | 4/2015 | Ritts | |
| 9,497,380 B1 | 11/2016 | Jannard et al. | |
| 2005/0134712 A1 | 6/2005 | Gruhlke et al. | |
| 2005/0221798 A1 | 10/2005 | Sengupta et al. | |
| 2006/0072020 A1 | 4/2006 | McCutchen | |
| 2007/0140678 A1 | 6/2007 | Yost et al. | |
| 2007/0145380 A1* | 6/2007 | Shum | H01L 33/385 257/79 |
| 2008/0101467 A1 | 5/2008 | MacMullan et al. | |
| 2008/0151084 A1 | 6/2008 | Lu et al. | |
| 2010/0188415 A1 | 7/2010 | Pettigrew et al. | |
| 2011/0154078 A1* | 6/2011 | Nrusimhan N.V. | G06F 1/3212 713/323 |
| 2011/0316851 A1 | 12/2011 | Pettigrew et al. | |
| 2012/0070082 A1 | 3/2012 | Tin | |
| 2012/0162483 A1 | 6/2012 | Sutton et al. | |
| 2012/0188336 A1 | 7/2012 | Ogasahara | |
| 2012/0188420 A1 | 7/2012 | Black et al. | |
| 2012/0238327 A1* | 9/2012 | Goris | H04M 1/22 455/566 |
| 2012/0309302 A1 | 12/2012 | Buhot | |
| 2012/0322369 A1* | 12/2012 | Khan | H04B 5/0031 455/41.1 |
| 2013/0237153 A1* | 9/2013 | Ryu | H04B 5/0043 455/41.1 |
| 2013/0263252 A1 | 10/2013 | Lien et al. | |
| 2013/0321590 A1 | 12/2013 | Kirk | |
| 2013/0322753 A1 | 12/2013 | Lim et al. | |
| 2014/0009646 A1 | 1/2014 | Attar et al. | |
| 2014/0098120 A1 | 4/2014 | Ritts | |
| 2014/0120832 A1* | 5/2014 | Confer | H04B 5/0031 455/41.1 |
| 2014/0181535 A1* | 6/2014 | Smith | H04W 12/06 713/300 |
| 2015/0019892 A1* | 1/2015 | Agrawal | H04B 5/0031 713/323 |
| 2015/0022643 A1 | 1/2015 | Stetson et al. | |
| 2015/0181197 A1 | 6/2015 | Baldwin | |
| 2015/0288945 A1 | 10/2015 | Nisenzon | |
| 2015/0312450 A1 | 10/2015 | Park | |

FOREIGN PATENT DOCUMENTS

| | | |
|---|---|---|
| CN | 102342084 | 2/2012 |
| CN | 103298080 | 9/2013 |
| EP | 1978740 | 10/2008 |
| EP | 2388987 | 11/2011 |
| EP | 2451150 | 5/2012 |
| EP | 2472581 | 7/2012 |
| WO | WO 2009075589 | 6/2009 |
| WO | WO-2009151903 | 12/2009 |

OTHER PUBLICATIONS

"Notice of Allowance", U.S. Appl. No. 13/646,769, dated Nov. 20, 2014, 4 pages.
"Ex Parte Quayle Action", U.S. Appl. No. 13/646,769, Jul. 22, 2014, 7 pages.
Hua, et al., "Dual-Sensor Foveated Imaging System", Applied Optics, vol. 47, No. 3, Jan. 20, 2008, pp. 317-327, Jan. 20, 2008, 11 pages.
Lan et al., "Benefits of Optical System Diversity for Multiplexed Image Reconstruction", Special Issue of Applied Optics on Task Specific Sensing, vol. 45, No. 13, pp. 2859-2870, (May 2006)., May 1, 2006, 12 pages.
Shankar, et al., "Multiaperture Imaging", Applied Optics, vol. 45, No. 13, pp. 2871-2883, May 2006., May 1, 2006, 13 pages.
Tavares, "Sessions: WebGL Techniques and Performance", Google I/O 2011, retrieved from <http:www.google.com/events/io/2011/sessions/webgl-techniques-and-performance.html> on Sep. 13, 2012, May 10, 2011, 2 pages.
Tavares, "WebGL Techniques and Performance", Google I/O 2011; Tuesday, May 10, 2011, 10:15-11, May 10, 2011, 7 pages.
"International Search Report and Written Opinion", Application No. PCT/US2014/062103, dated Feb. 9, 2015, 13 pages.
"Non-Final Office Action", U.S. Appl. No. 14/335,841, dated May 5, 2016, 25 pages.
"Final Office Action", U.S. Appl. No. 14/335,841, dated Oct. 21, 2016, 28 pages.
"Non-Final Office Action", U.S. Appl. No. 14/335,841, dated Jun. 2, 2017 00:00:00.0, 29 pages.
"Pixel size & sensitivity", https://www.pco-tech.cam/fileadmin/user_upload/db/download/kb_pixel_size_sensitivity_20100721.pdf, pp. 1-4.
"Final Office Action", U.S. Appl. No. 14/335,841, dated Nov. 17, 2017, 30 pages.
"Foreign Office Action", CN Application No. 201480034086.8, dated Oct. 26, 2017, 30 pages.
"Foreign Office Action", EP Application No. 14772236.7, dated Dec. 19, 2017, 7 pages.
"Foreign Office Action", European Application No. 14772236.7, dated Jul. 17, 2019, 3 pages.
"Foreign Office Action", Chinese Application No. 201480034086.8, dated Sep. 10, 2019, 7 pages.
"Foreign Office Action", Chinese Application No. 201480058590.1, dated Jun. 1, 2018, 11 pages.
"Non-Final Office Action", U.S. Appl. No. 14/335.841, dated May 18, 2018, 33 pages.
"Foreign Office Action", CN Application No. 201480034086.8, dated Sep. 14, 2018, 28 pages.
"Foreign Office Action", Chinese Application No. 201480034086.8, dated Apr. 9, 2019, 10 pages.
"International Preliminary Report on Patentability", Application No. PCT/US2014/047313, dated Jan. 19, 2016, 6 pages.
"Final Office Action", U.S. Appl. No. 14/335,841, dated Dec. 31, 2018, 26 pages.
"Foreign Office Action", European Application No. 14795746.8, dated Feb. 26, 2019, 5 pages.

* cited by examiner

SENSOR-BASED NEAR-FIELD COMMUNICATION AUTHENTICATION

BACKGROUND

This background description is provided for the purpose of generally presenting the context of the disclosure. Unless otherwise indicated herein, material described in this section is neither expressly nor impliedly admitted to be prior art to the present disclosure or the appended claims.

Computing devices often enter a sleep state responsive to expiration of an inactivity timeout or user input to do so. When entering a sleep state, a computing device typically locks (e.g., screen lock) to protect user data or prevent unintentional activation of one of the device's functionalities. Once in the sleep state, various components or subsystems of the computing device are powered down to reduce the device's power consumption and extend battery life.

Waking and/or unlocking the computing device, however, often requires that some components of the device remain active during, or be woken prior to leaving, the sleep state. For example, to enable entry of a personal identification number (PIN) code for device unlocking, a processor, display, and associated touch-screen require power to receive the PIN code from a user. As such, these active components draw current when the device is in the sleep state or while locked, which results in increased power consumption, reduced device runtime, and/or decreased device efficiency.

BRIEF DESCRIPTION OF THE DRAWINGS

Techniques and apparatuses for sensor-based near-field communication (NFC) authentication are described with reference to the following drawings. The same numbers are used throughout the drawings to reference like features and components.

DETAILED DESCRIPTION

Conventional techniques for unlocking a device often rely on keeping active, or unnecessarily waking, various components of the device useful to perform higher-level authentication operations. These kept-active or unnecessarily-woken components, however, drain a battery of the device while the device is in a sleep state. Additionally, hardware and software interdependencies between these components and other components of the device may prevent the device from reaching lower activity states (e.g., deeper sleep state) that provide additional power-savings.

This disclosure describes techniques and apparatuses for sensor-based NFC authentication, which enable a computing device to detect, while in a low-power or sleep state, environmental variances indicating proximity of an NFC enabled-device with which to authenticate. By so doing, components of the computing device may be left in respective low-power or sleep states until initiation of an authentication process to wake and/or unlock the device.

The following discussion first describes an operating environment, followed by techniques that may be employed in this environment, and ends with example apparatuses.

Operating Environment

Figure 1:
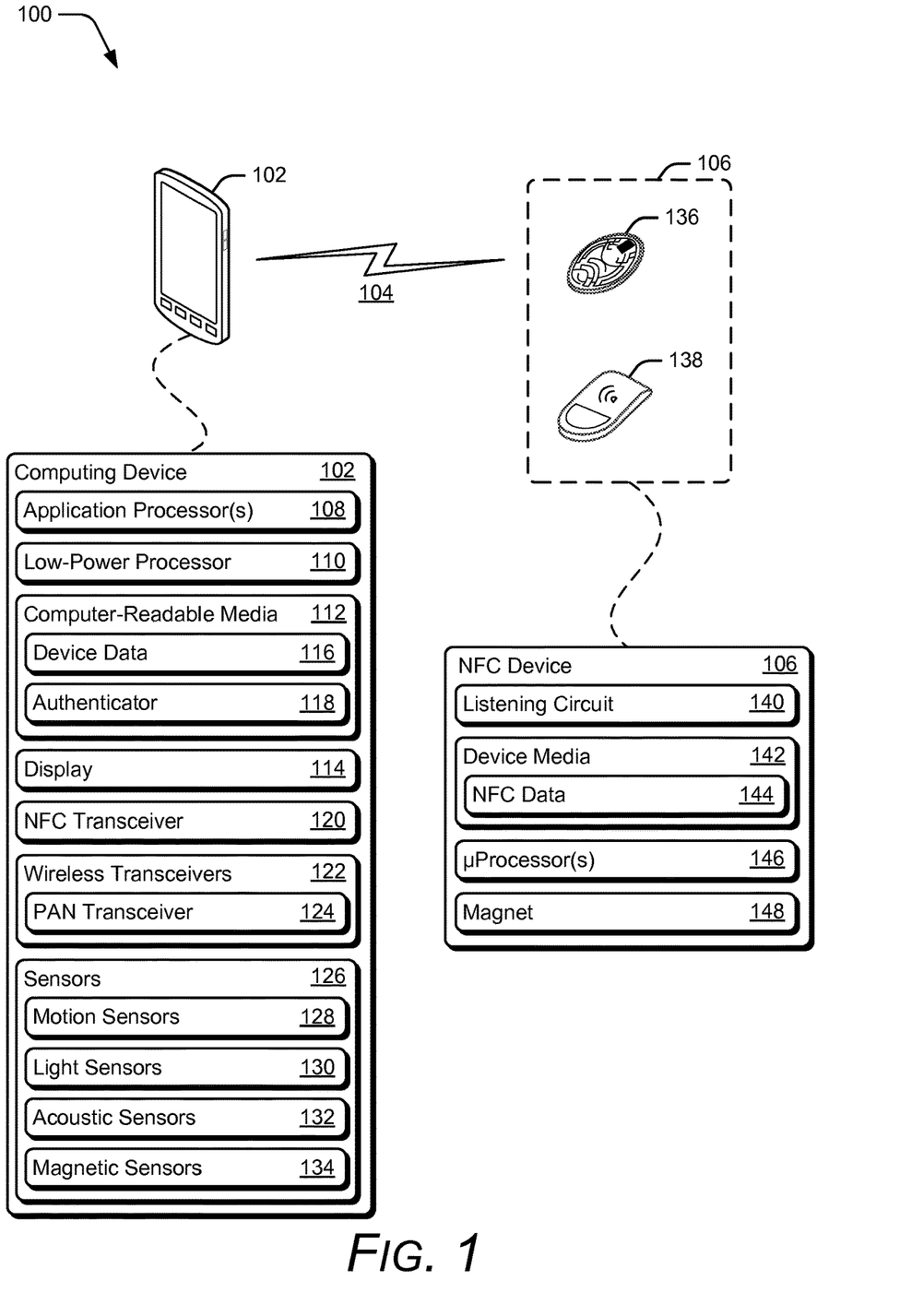
FIG. 1 illustrates an example environment in which techniques for sensor-based NFC authentication can be implemented.

FIG. 1 illustrates an example environment 100 in which techniques for sensor-based NFC authentication can be implemented. This example environment 100 includes a computing device 102, wireless communication medium 104, and near-field communication-enabled device 106 (NFC device 106). Computing device 102 can be, or include, many different types of computing or electronic devices capable of implementing authentication operations. In this example, computing device 102 is shown as a smart phone, though other devices are contemplated. Other computing devices 102 may include, by way of example only, a cellular phone, notebook computer (e.g., netbook or ultrabook), smart-watch, tablet computer, personal media player, personal navigating device (e.g., global positioning system), gaming console, desktop computer, video camera, or portable gaming device.

Computing device 102 includes application processor(s) 108 and low-power processor 110. Application processor 108 may be configured as a single or multi-core processor capable of enabling various functionalities of computing device 102. In some cases, application processor 108 includes a digital-signal processing (DSP) subsystem for processing various signals or data of computing device 102. Application processor 108 is coupled with, and implements functionalities of, other components of computing device 102 as described below.

In various embodiments, application processor 108 is a full-featured or high-power processor having one or more processing cores or subsystems. Each core of application processor 108 may have multiple operational or activity states, such as full-power, partial-power (e.g., decreased operating voltage or frequency), sleep, or off. Transitioning application processor 108, or cores thereof, between these activity states, such as progressing from full-power to sleep, decreases an amount of power consumed by application processor 108. Alternately or additionally, activity states of application processor 108 may correspond with respective activity states of computing device 102. Thus, when computing device 102 enters a sleep state or low-power state, application processor 108 can enter a sleep state or low-power state in which power is conserved.

Low-power processor 110 may be configured as a low-power processor core, embedded controller, or micro-controller. Low-power processor 110 is unable to implement some of the functionalities implemented by application processor 108. In some cases, low-power processor 110 lacks function-specific data interfaces, such as a dedicated communication, memory, or display interface. Low-power processor 110 may include an interface to a general purpose data bus (parallel or serial) or general purpose input/outputs (GPIOs) with which to receive or transmit data.

Low-power processor 110 may be implemented as a reduced-instruction set computing (RISC) processor, which has a smaller instruction set, operates at a lower frequency, or has fewer processing capabilities than the application processor 108. For example, when application processor 108 is configured as a multi-core processor implementing a 32-bit instruction set, low-power processor 110 may be configured as a RISC-based micro-controller that implements a 16-bit instruction set. Application processor 108 and/or low-power processor 110 may each be implemented separately as disparate components (shown), or implemented together as an application processor with integrated companion micro-controller (not shown).

Computing device 102 includes computer readable-media 112 and display 114. Computer-readable media 112 (CRM 112) includes device data 116 and authenticator 118, which in this example is embodied as computer-executable code stored on CRM 112. Device data 116 may include an operating system, firmware, or applications of computing device 102 that are executable by application processor 108 and/or low-power processor 110. Alternately or additionally, device data 116 may include various user data, such as images, music, documents, emails, contacts, and the like.

Authenticator 118 manages authentication, security, and/or cryptographic operations of computing device 102. By way of example, authenticator 118 may lock computing device 102 when computing device 102 enters a sleep state and unlock computing device 102 responsive to authenticating a user thereof. Further implementations and uses of authenticator 118 vary and are described below in greater detail. Display 114 enables user interaction with content-related applications or graphical user-interfaces of computing device 102. In such cases, the display may be associated with, or include, a touch sensitive input device (e.g., touchscreen) through which user input is received. Display 114 can be configured as any suitable type of display, such as an organic light emitting diode (OLED) display, active matrix OLED display, liquid crystal display (LCD), in-plane shifting LCD, and so on.

Although not shown, computing device 102 may also include other components to enable user interaction, such as light emitting diodes (LEDs), a vibrator (e.g., vibrational motor), and one or more speakers. These components are useful to provide alerts, notifications, or indications to a user of computing device 102. For example, an LED may be turned on, changed to another color, or flashed to provide a notification to a user of computing device 102. In other cases, computing device 102 may vibrate via a vibrator or emit an audio alert via a speaker.

Computing device 102 also includes near-field communication transceiver 120 (NFC transceiver 120) and wireless transceivers 122, which includes personal-area-network transceiver 124 (PAN transceiver 124). NFC transceiver 120 is configured to enable communication with NFC device 106 in via wireless communication medium 104 in accordance with various NFC standards, such as ISO 18000-3, ISO/IEC 18092, ECMA-340, ISO/IEC 21481, and ECMA 352, just to name a few. NFC transceiver 120 may actively search for other NFC-enabled devices within range (e.g., 20 centimeters) with which to communicate.

Wireless transceiver(s) 122 may include any suitable type of transceiver configured to communicate via a wireless network (not shown). Examples of these wireless networks include a wireless wide-area networks (WWAN), wireless local-area network (WLAN) and wireless personal-area network (wireless PAN), each of which may be configured, in part or entirely, as infrastructure, ad-hoc, or mesh networks. For example, PAN transceiver 124 can be a short-range wireless transceiver configured to communicate over a wireless personal-area-network (PAN) in accordance with a Bluetooth™ protocol. The Bluetooth™ family of protocols support various communication profiles for communicating various types of data and/or enabling different feature sets between devices associated via a wireless PAN.

The Bluetooth™ family of protocols also support "pairing" between devices, which may enable computing device 102 to associate with other devices. When initially pairing with another device, computing device 102 can store self-identifying information (e.g., medium access control (MAC) address) associated with the other device in an information table (e.g., a pairing table) for future use. The information table can also store a context associated with the other device, such as an identity of a user, a mode of use for computing device 102, or a location of the other device. For example, computing device 102 may associated a particular Bluetooth™ ear-bud with a user and subsequently determine proximity with the user whenever PAN transceiver 124 is able to communicate with this particular Bluetooth™ ear-bud.

Although not shown, computing device 102 may include wired data interfaces for communicating with other devices, such as an Ethernet transceiver, serial data interface, audio/video port (e.g., high-definition multimedia interface (HDMI) port), or universal serial bus (USB) port. These wired data interfaces may implemented using standard connectors or through the use of proprietary connectors and associated cables providing enhanced security or interconnect density.

Sensors 126 enable computing device 102 to sense various properties, variances, stimuli, or characteristics of an environment in which computing device 102 operates. In this particular example, sensors 126 include motion sensor (s) 128, light sensors 130, acoustic sensor 132, and magnetic sensor 134. Although not shown, sensors 126 may also include temperature/thermal sensors, global-positioning modules, micro-electromechanical systems (MEMS), capacitive touch sensors, and so on. Alternately or additionally, sensors 126 enable interaction with, or receive input from, a user of device 102. In such a case, sensors 126 may include piezoelectric sensors, cameras, capacitive touch sensors, input sensing-logic associated with hardware switches (e.g., keyboards, snap-domes, or dial-pads), and so on.

Motion sensors 128 include accelerometers or motion sensitive MEMS configured to sense movement or orientation of computing device 102. Motion sensors 128 can sense movement or orientation in any suitable aspect, such as in one-dimension, two-dimensions, three-dimensions, multi-axis, combined multi-axis, and the like. In some embodiments, motion sensors 128 enable computing device 102 to sense gesture inputs (e.g., a series of position and/or orientation changes) made when a user moves computing device 102 in a particular way.

Light sensors 130 include ambient light sensors, optical sensors, or photo-diodes configured to sense light around computing device 102. Light sensors are capable of sensing ambient light or directed light, which can then be processed by a DSP or processor of computing device 102 to determine whether authentication should be initiated. For example, changes in ambient light may indicate that a user has picked up computing device 102 or removed computing device 102 from his or her pocket. In some cases, a light-emitting accessory such as a ring or bracelet may be associated with a user. In such cases, light sensors 130 may detect a coded pulse of light (visible or infrared) emitted by the ring or bracelet. In some embodiments, computing device 102 can identify or differentiate a user based on light or light patterns (e.g., pulses or colors) detected by light sensors 130.

Acoustic sensors 132 include microphones or acoustic wave sensors configured to monitor sound of an environment that computing device 102 operates. Acoustic sensors 132 are capable of receiving voice input of a user, which can then be processed by a DSP or processor of computing device 102. Sound captured by acoustic sensors 132 may be analyzed or measured for any suitable component, such as pitch, timbre, harmonics, loudness, rhythm, envelope characteristics (e.g., attack, sustain, decay), and so on. In some embodiments, computing device 102 identifies or differentiates a user based in input received from acoustic sensors 132.

Magnetic sensors 134 include a hall-effect sensor, magneto-diode, magneto-transistor, magnetic sensitive MEMS, or magnetometers configured to sense magnetic field characteristics around computing device 102. Magnetic sensors 134 may sense a change in magnetic field strength, magnetic field direction, or magnetic field orientation. In some embodiments, computing device 102 determines proximity with a user or another device based on input received from magnetic sensors 134.

In some embodiments, sensors 126 are operably coupled with low-power processor 110, which can be configured to receive input from sensors 126 while computing device 102 is in a sleep state (e.g., low-power state). Low-power processor 110 is capable of processing the input from sensors 126 to detect properties or parameters of an environment in which computing device 102 operates. For example, low-power processor 110 can determine an orientation of, or gestures performed with, computing device 102 with respect to a three-dimensional coordinate system via accelerometers. Input received from sensors 126 may also be sent to applications executing on application processor 108 to enable environmental-based functionalities of the applications.

NFC devices 106 may be, or include, many different types of circuits or electronic devices capable of communicating via NFC. In this example, NFC devices 106 are shown as an NFC tag 136 and NFC-enabled magnetic snap 138 (NFC snap 138). Other NFC devices 106 may include, by way of example only, an NFC sticker, point-of-sale (POS) terminal, radio-frequency identification (RFID) tag, NFC-enabled ring, vehicle dock, charging station, authentication token, smart phone, or camera.

Each NFC device 106 includes listening circuit 140 and NFC device media 142 (device media 142), which may include read-only memory (ROM), random-access memory (RAM), electronically erasable programmable ROM (EEPROM), and the like. Listening circuit 140 is configured to enable communication with computing device 102 through NFC via wireless communication medium 104. In cases in which NFC device 106 is not self-powered, NFC device 106 receives power from computing device 102 via listening circuit 140. The power received from computing device 102 powers the components of NFC device 106 to enable various functionalities thereof.

Device media 142 stores NFC device data 144 (NFC data 144), which may include any suitable type of data, such as a unique identification number of NFC device 106 (e.g., serial number), tag data, uniform resource identifier (URIs), uniform resource locator, passwords, private keys, network-setup information, and so on. NFC data 144 is formatted in accordance with NFC data exchange format (NDEF) or another suitable data format (e.g., proprietary or encrypted). Alternately or additionally, NFC data 144 may be structured (e.g., serialized, packetized, or framed) for communication or transport using these data formats.

Some NFC devices 106 also include micro-processor(s) 146 (μprocessor(s) 146) and/or magnet 148. Micro-processor 146 can be implemented as an embedded controller or micro-controller capable of performing various data processing tasks. Micro-processor 146 may also access device media 142 to read, write, or otherwise manipulate NFC data 144. Magnet 148 generates a magnetic field that is detectable external to NFC device 106 and may be any suitable type of magnet or electro-magnet, such as ferrous or rare earth (e.g., neodymium). Some NFC devices 106 may include multiple magnets 148 to provide other functionalities, such as magnetic clasping or attachment to other metallic or magnetic objects.

Figure 2:
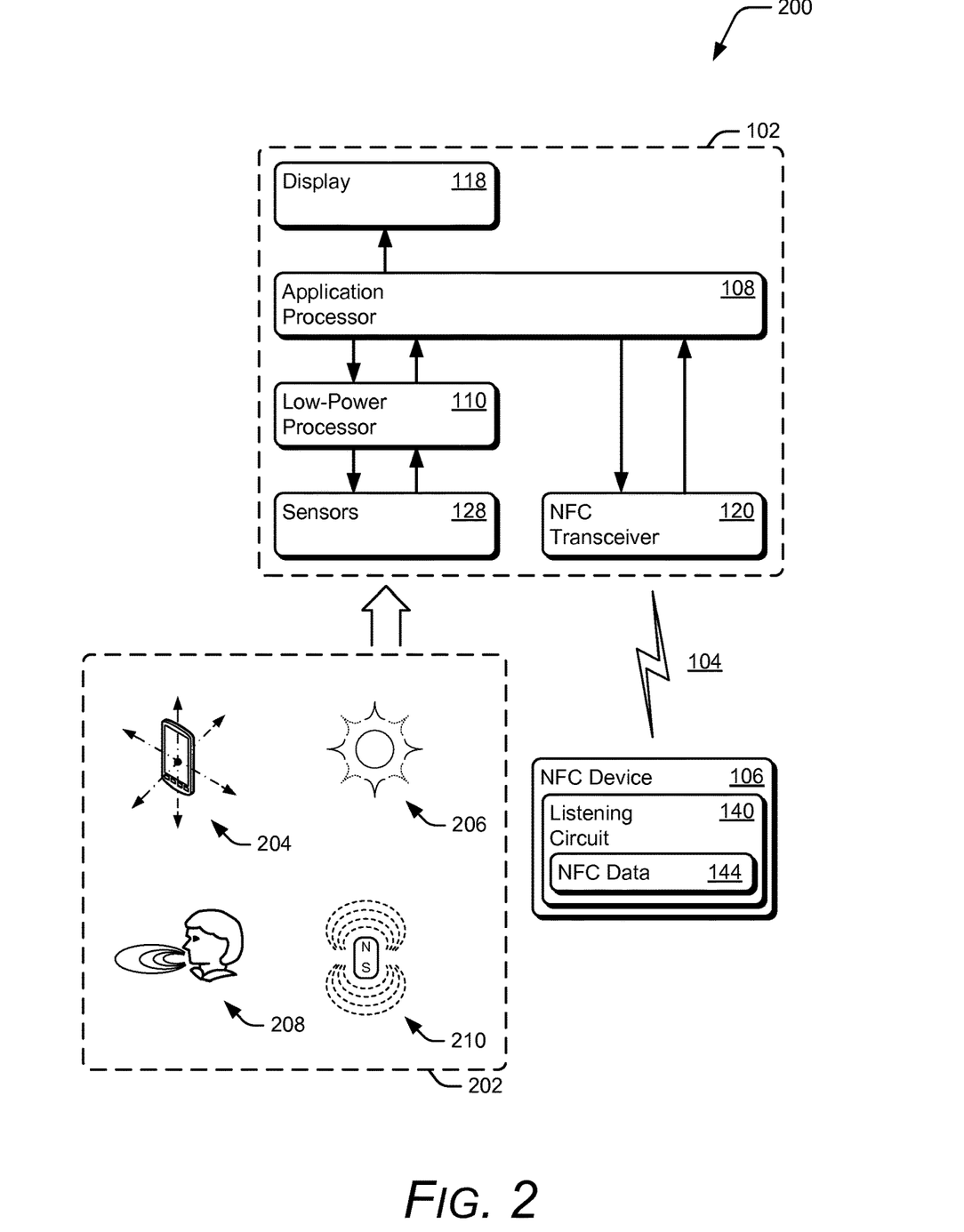
FIG. 2 illustrates example device configurations capable of implementing sensor-based NFC authentication.

FIG. 2 illustrates example device configurations 200 that are capable of implementing one or more embodiments of sensor-based NFC authentication. In this particular example, computing device 102 is proximate NFC device 106 that includes listening circuit 140 and NFC data 144. NFC data 140 includes authentication information (not shown) useful to authenticate a user of computing device 102. For example, when computing device 102 is locked, transmission of the authentication information from NFC device 106 to computing device 102 via wireless communication medium 104 enables authentication of the user and unlocking of computing device 102.

When computing device 102 is in a low-power state (e.g., sleep or standby), application processor 108, display 118, and NFC transceiver 120 of computing device 102 are powered-down to their respective low-power states. In the context of this example, other components of computing device 102 (not shown for visual brevity) may also by powered-down to their respective low-power states. Alternately or additionally, functionalities of computing device 102 are locked to protect user data or prevent unintentional activation of the functionalities (e.g., accidental touch dialing).

Low-power processor 110, which remains in at least a semi-active state while computing device 102 sleeps, is operably coupled with sensors 126. Sensors 126 may include motion sensors, light sensors, acoustic sensors, and/or magnetic sensors configured to monitor an environment in which computing device 102 operates. Low-power processor 110 monitors sensors 126 to detect movement, light, sound, or magnetic field variances, which may indicate a presence of magnetically-enabled NFC devices 106 (e.g., NFC snap 138).

Presence of the NFC devices may be concurrent or prospective, such as within three seconds of detecting the environmental variance. The use of low-power processor 110 to detect other devices enables application processor 108 and NFC transceiver 120 to remain in low-power states, which conserves power of computing device 102. In the context of this example, low-power processor 110 can sense, via sensors 126, environmental variances 202 generated by a user's gesture, changes in ambient light, light patterns, user's voice, or a magnet associated with the user (e.g., NFC snap 136). In this particular example, environmental variances 202 are illustrated as multi-axial gesture 204, ambient light 206, voice command 208, and magnetic field 210. Alternately or additionally, presence or proximity with an NFC device may be determined via a wireless transceiver. For example, PAN transceiver 124 may detect a Bluetooth™ headset of a user, and determine that an NFC tag associated with the user is present.

Once the presence of NFC device 106 is detected (concurrent or prospective), low-power processor 110 can wake application processor 108 to initiate authentication operations with NFC device 106. For example, application processor can implement, via authenticator 118, authentication operations using authentication data received from NFC device 106 via NFC transceiver 120. Alternately or additionally, application processor can turn on display 118 to notify a user of the initiation of authentication operations. Authenticator 118 can then unlock computing device 102 on completion of the authentication operations with NFC device 106.

Leaving application processor 108 and/or NFC transceiver 120 in low-power states until NFC device 106 is detected can enable considerable power savings in a computing device 106. Alternately or additionally, the use of low-power processor 110 and sensor 126 to wake components that perform authentication operations may also preclude a user from having to wake computing device 102 (e.g., via hardware button) or manually enter authentication information.

Figure 3:
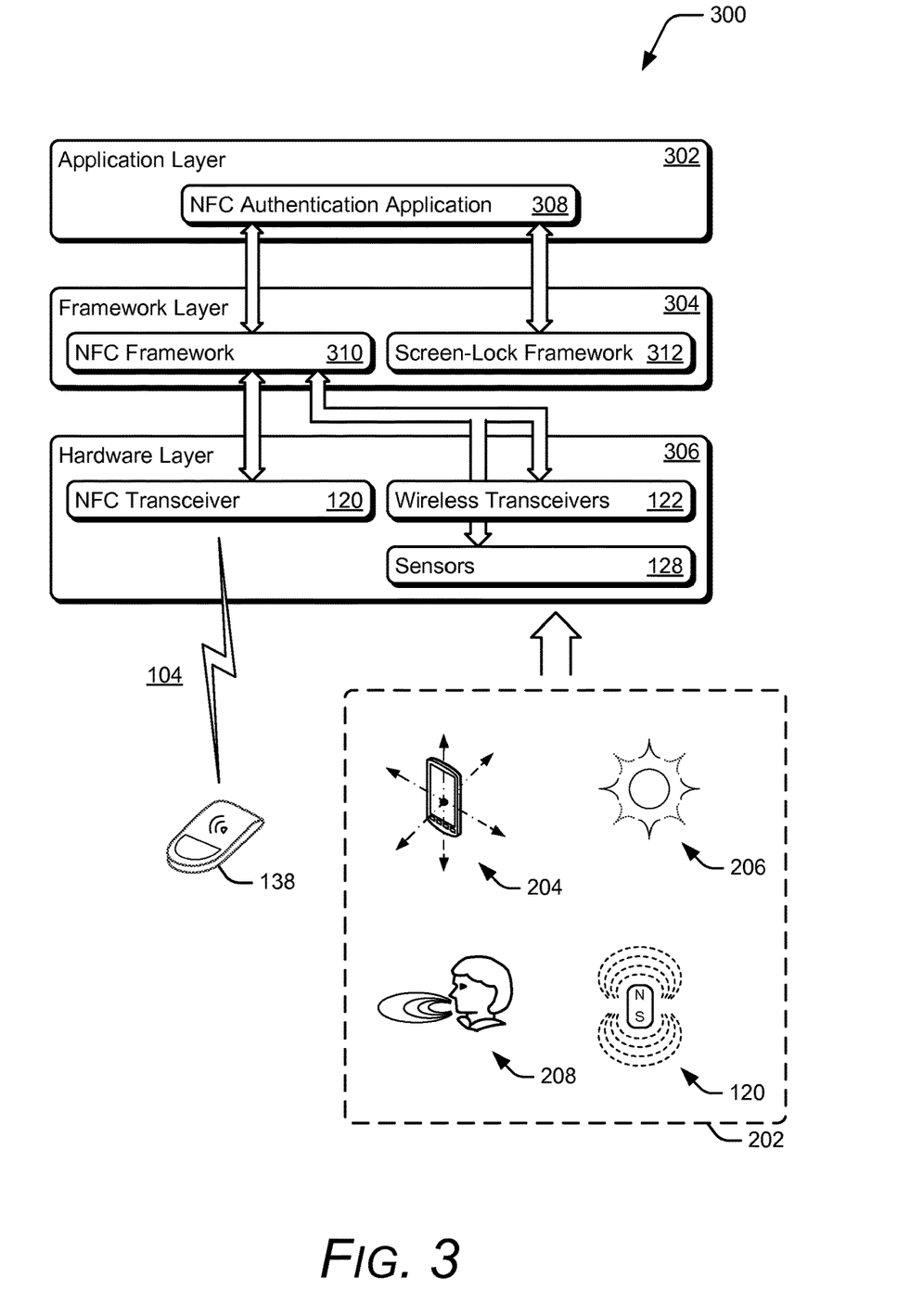
FIG. 3 illustrates an example stack architecture for implementing embodiments of sensor-based NFC authentication in a device.

FIG. 3 illustrates an example stack architecture 300 for implementing embodiments of sensor-based NFC authentication in a device. Stack architecture 300 includes application layer 302, framework layer 304, and hardware layer 306, in which functionalities of computing device 102 are implemented. Applications of computing device 102, such as NFC authentication application 308, execute via application processor 108 and are implemented in application layer 302. In some cases, NFC authentication application 308 is implemented by a DSP subsystem of computing device 102 to conserve power. NFC authentication application 308 may be implemented in association with authenticator 118 to perform various authentication operations.

Applications of application layer 302 access data, services, and other resources of computing device 102 via framework layer 304. Framework layer 304, or components thereof, is provided by an operating system (not shown) of computing device 102 that is also executed by application processor 108. Thus, functionalities of application layer 302 and framework layer 304 are enabled when application processor 108 is an active state. Alternately or additionally, partial functionalities of application layer 302 or framework layer 304 can be implemented by a DSP subsystem when application processor 108 is in a sleep state.

Hardware components of computing device 102 are implemented in hardware layer 306, which in this example includes NFC transceiver 120, wireless transceivers 122, and sensors 126. Hardware components in hardware layer 306 may operate independent of an activity state of computing device 102 or higher-level layers of stack architecture 300. For example, when computing device 102 is in a low-power state, NFC transceiver 120, wireless transceivers 122, or sensors 126 may remain powered and/or in an active state. In the context of stack architecture 300, sensors 126 are monitored by low-power processor 110 (not shown) while application processor 108 is in a low-power state. NFC interface 120 may also actively search for other NFC-enabled devices while computing device 102 or application processor 108 is in a low-power state. Alternately or additionally, wireless transceivers 122 (e.g., PAN transceiver 124) may remain in a communicative state to detect wireless networks or other devices with which to communicate.

As shown by stack architecture 300, environmental variances 202 detected by sensors 126 can initiate operations in other layers of the architecture stack. By way of example, assume that computing device 102 is placed in proximity (e.g., zero to five centimeters) of NFC snap 138 as shown. Also assume that computing device 102 is locked and in a sleep state, in which application processor 108 and NFC transceiver 120 are also in respective low-power states. Here, low-power processor 110 detects, via magnetic sensor 134, magnetic field 210 generated by NFC snap 138 (e.g., magnetic field caused by magnet 148). Low-power processor 108 then wakes application processor 108 to enable application layer 302 and framework layer 304, which in turn enables functionalities of those layers. Alternately or additionally, any sensed combination of two or more environmental variances 202 may be effective wake application processor 108 to enable further processing of environmental variances 202 or to initiate authentication operations.

The environmental variance (change in magnetic field strength) sensed by sensors 126 is communicated to NFC framework 310, which then initiates communication with NFC snap 138 via NFC transceiver 120 over wireless communication medium 104. Here, NFC authentication application 308 queries NFC snap 138 for authentication information with which to perform various authentication operations. NFC authentication application 308 is configured to authenticate a user of computing device 102 or authenticate with an NFC device 106 enabling higher-level interaction therewith (e.g., data exchange, streaming content, or network configuration). In the context of the present example, NFC authentication application 308 authenticates a user with which NFC snap 138 is associated and unlocks computing device 102 via screen-lock framework 312.

Example Techniques

The following discussion describes techniques for sensor-based NFC authentication, which enable a computing device to detect, in a low-power state, proximity of an NFC-enabled device with which to authenticate via NFC. In at least some embodiments, the computing device detects the NFC-enabled device via a sensor precluding the need for a user to initiate authentication operations. These techniques can be implemented utilizing the previously described environment, such as authenticator 118, NFC transceiver 120, and/or sensors 126 of FIG. 1. These techniques include example methods illustrated in FIGS. 4-6, which are shown as operations performed by one or more entities. The orders in which operations of these methods are shown and/or described are not intended to be construed as a limitation, and any number or combination of the described method operations can be combined in any order to implement a method, or an alternate method, including any of those illustrated by FIGS. 4-6.

Figure 4:
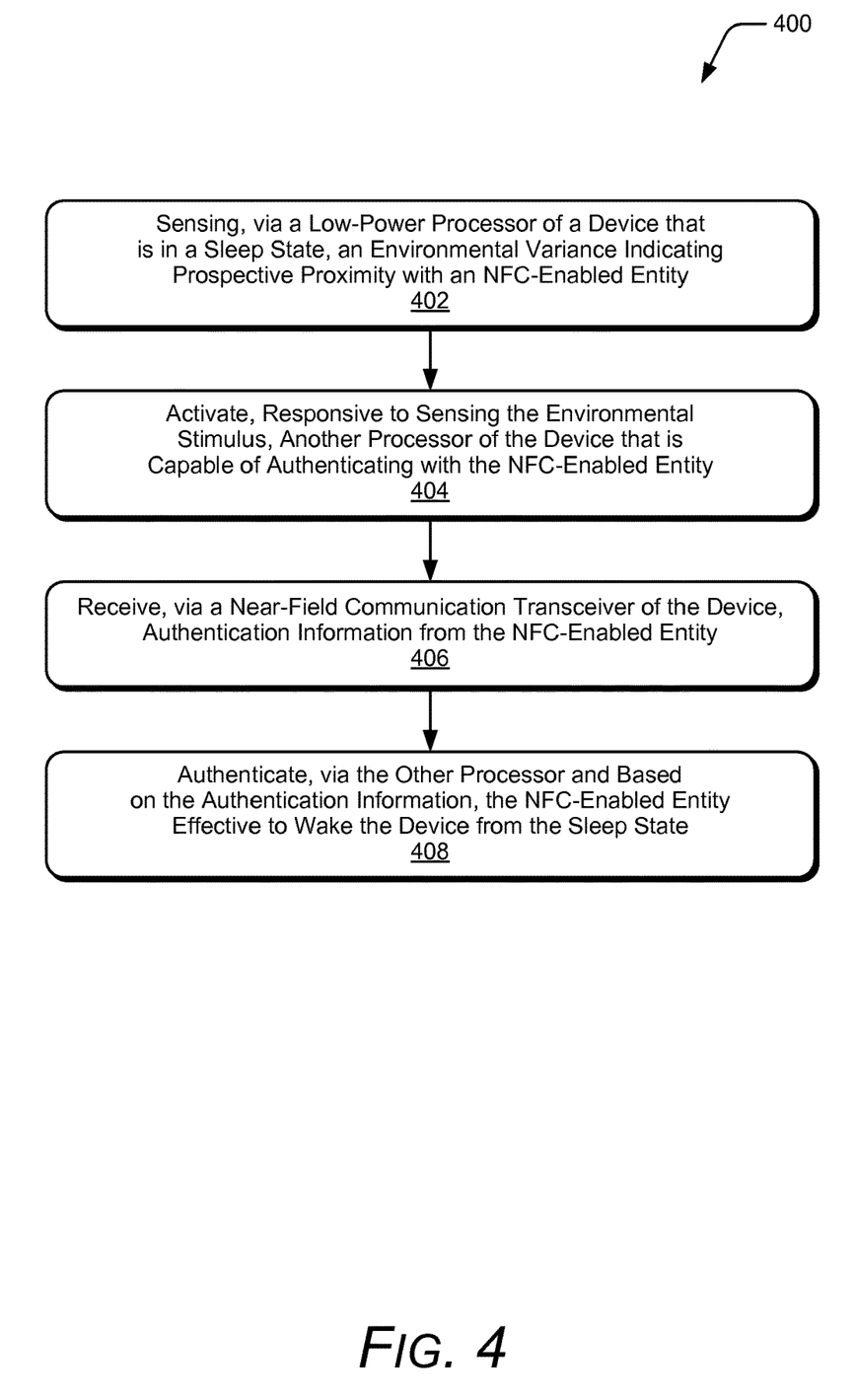
FIG. 4 illustrates a method of sensor-based NFC authentication in accordance with one or more embodiments.

FIG. 4 illustrates an example method 400 of sensor-based NFC authentication in accordance with one or more embodiments.

At 402, an environmental variance that indicates proximity with an NFC enabled entity is detected. The environmental variance is detected by a low-power processor of a device that is in a sleep state and/or locked. The low-power processor detects the environmental variance by monitoring a sensor, such as a motion sensor, acoustic sensor, or magnetic sensor. The NFC-enabled device may include any suitable NFC device, such as an NFC snap, NFC sticker, NFC ring, or other NFC devices described herein. Alternately or additionally, the NFC-enabled device may be configured to generate the environmental variance, such as through use of an integrated magnet or a light-emitting diode configured to generate pulse-coded light.

Consider an example in which a user locked their smart phone and possesses an NFC tag that includes their authentication information. In the context of example operating environment 100 and devices configurations 200, computing device 102 (a smart phone in this example) enters a sleep state when locked, and application processor 108, display 114, NFC transceiver 120, and other components are powered-down into low-power states to conserve power. Low-power processor 110 then monitors sensors 126 while computing device 102 is in the sleep state, including motion sensors 128 for an unlock gesture or acoustic sensors 134 for the user's voice.

Assume here that the user of computing device 102 desires to book travel arrangements via an application of computing device 102 (currently locked) and that the user possesses an NFC tag 136 that includes the user's authentication information. The user can initiate an unlock sequence by moving computing device 102 to enter an unlock gesture or use a voice command to do so. Here, when the user speaks a voice command (e.g., "phone unlock"), low-power processor 110 detects the spoken voice command of the user, which indicates the user's desire to unlock computing device 102. Alternately, the user could move computing device 102 in such a way as to enable low-power processor 110 to sense an unlock gesture indicating the user's desire to unlock computing device 102.

At 404, another processor of the device is activated in response to detection of the environmental variance. As noted, this variance indicates proximity with the NFC-enabled entity. This other processor is an application processor or full-featured processor of the device that is capable of implementing authentication and communication functionalities of the device. In some cases, the other processor is a DSP subsystem of the device that consumes less power than an application processor, yet is powerful enough to implement the authentication and communication functionalities of the device.

In the context of the present example, low-power processor 110 activates application processor 108, which in turn implements authenticator 118 and enables functionalities of NFC transceiver 120. Other components of computing device 102, such as display 118, wireless transceivers 122, and wired data interfaces may remain in low-power states to continue saving power of computing device 102.

At 406, authentication information is received from the NFC-enabled entity via an NFC transceiver of the device. The authentication information may include a unique identification number, serial number of the NFC-enabled entity, previously transmitted random number, cryptographic hash number, or any suitable combination thereof. This authentication information enables subsequent authentication operations to be performed for verifying an identity of the NFC-enabled entity or a user in possession thereof. In some cases, the NFC transceiver of the device may be in an idle or sleep state prior to detecting the environmental variance. In such cases, the low-power processor may wake the NFC transceiver to enable communication with the NFC-enabled entity.

In the ongoing example, authenticator 118 establishes NFC communications with NFC tag 136 via NFC transceiver 120. Authenticator 118 then queries NFC tag 136 for authentication information associated with the user of computing device 102. Here, assume that the authentication information includes a unique serial number of NFC tag 136 that is appended with a random number previously programmed into NFC tag 136 by computing device 102.

At 408, the NFC-enabled entity is authenticated based on the authentication information received via NFC. Authenticating the NFC-enabled entity includes comparing the received authentication information with known authentication information, which may be stored locally on the device. The authentication is performed using the other processor of the device, through which the NFC framework and authentication applications of the device are accessed. In other cases, the authentication may be performed using a DSP subsystem of the device, enabling the application processor to remain in a sleep state. Once authentication is successful, the device is woken from the sleep state to implement the operating system and application(s) of the device. Alternately or additionally, the device can be unlocked from a locked state to enable a user to access the device.

Concluding the present example, authenticator 118 of computing device 102 compares the authentication information received from NFC tag 136 with local authentication information stored in device data 116. This local authentication information includes the serial number of NFC tag 136 and the random number that computing device 102 had previously programmed into NFC tag 136. Assume here that authenticator 118 determines that the received authentication information matches the local authentication information. Authenticator 118 then wakes the other components of computing device 102 and unlocks computing device 102 so that the user can access his or her email application.

Figure 5:
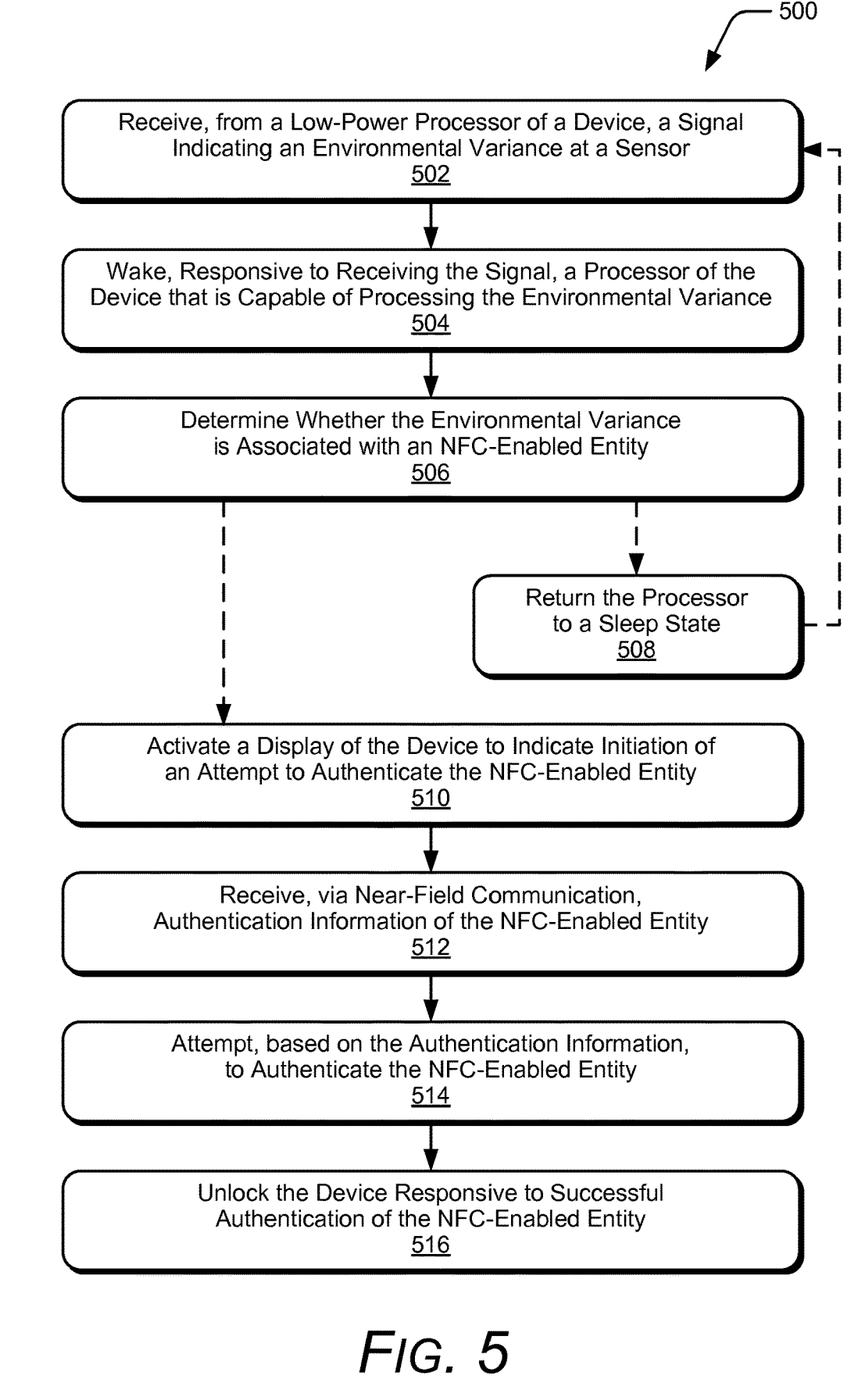
FIG. 5 illustrates another method of sensor-based NFC authentication in accordance with one or more embodiments.

FIG. 5 illustrates another example method 500 of sensor-based NFC authentication in accordance with one or more embodiments.

At 502, a signal is received from a low-power processor of a device that is locked. The signal indicates an environmental variance at a sensor configured to monitor an environment in which the device operates. In some cases, the environmental variance is associated with a user of the device or an accessory useful to identify the user (e.g., NFC snap). The environmental variance includes movement of the device, sounds or noise around the device, or changes in a magnetic field near the device.

The low-power processor can monitor sensors of the device to determine proximity with NFC-enabled entities with which to authenticate. These sensors may include motion sensors, light sensors, acoustic sensors, magnetic sensors, capacitive touch sensors, and the like. The signal received may be received by another processor of the device that is in a sleep state or low-power state. Alternately or additionally, the signal is received by an entity associated with, and capable of waking, the other processor (e.g., authenticator 118 or a DSP subsystem).

At 504, another processor of the device is woken from a low-power state in response to receiving the signal indicating the environmental variance. Prior to detecting the environmental variance, the other processor resides in the low-power state to conserve energy of the device. This other processor is an application processor or a DSP subsystem of the device, which is capable of processing the environmental variance. For example, a DSP subsystem of the device may be woken from a low-power state to process accelerometer output or sound information received by a microphone.

At 506 it is determined whether the environmental variance is associated with prospective proximity with an NFC-enabled entity. The environmental variance is compared to known information to determine whether the environmental variance is associated with the NFC-enabled entity or a user of the device. For example, motion sensor data can be compared to known user-associated gestures to determine a user is attempting to initiate an unlock procedure of the device. Alternately, acoustic data can be compared to known user voice-prints or voice-profiles to determine if the sound received by the microphone is a valid user voice-command to initiate an unlock procedure of the device.

At 508, the other processor is returned to a sleep state in response to determining the environmental variance is not associated with an NFC-enabled device or a user thereof. This may be responsive to a movement of the device failing to correspond with a known user gesture or captured sound failing to correspond with a known user voice-command. By so doing, power of the computing device is saved until a subsequent detection of an environmental variance and possible authentication attempt. Alternately or additionally, the determination that the environmental variance is not associated with an NFC-enabled entity may be logged for later analysis. For example, the failure and characteristics of the environmental variance may be used in calibrating the sensors of the device to reduce false-positive detections. From operation 508, method 500 returns to operation 502 where the low-power processor resumes monitoring sensors for environmental variances or stimuli.

At 510, a display of the device is activated to indicate initiation of an attempt to authenticate the NFC-enabled entity. Alternately or additionally, a vibrator or LED indicator of the device may be activated indication initiation of the attempt to authenticate. In some cases, the display may present a graphical indication of the authentication, such as a lock-screen animation, visual indication of authentication progress (e.g., progress bar), an icon identifying of the NFC-enabled entity (by name or type), and the like.

At 512, authentication information of the NFC-enabled entity is received via an NFC interface of the device. The NFC interface may include an NFC transceiver, NFC resources in a stack framework layer, and an NFC application that is capable of NFC-based authentication. In some cases, the NFC interface of the device is activated from a low-power state prior to receiving the authentication information. As discussed above with respect to the other processor of the device, leaving the NFC interface in the low-power state until the NFC-enabled entity is detected permits the computing device to conserve power.

At 514, authentication of the NFC-enabled entity is attempted using the authentication data received via the NFC interface. The attempt to authenticate is executed via the other processor of the device, which is capable of implementing the authentication operations. In some cases, the authentication operations are implemented by a DSP subsystem of the device, precluding the need to activate an application processor. This attempt to authenticate is performed prior to waking other components the device, enabling power to be conserved until an attempt to authenticate is successful.

At 516, the device is unlocked in response to successful authentication of the NFC-enabled entity. Unlocking the device is effective to enable access to data and/or functionalities of the device. In some cases, an indication of the unlocking is presented to a user via a display or speaker, such as removal of a lock-screen or playback of an audio alert. In other cases, additional components of the device can activated from low-power states to fully wake the device prior to the unlocking. Alternately, the device may remain locked in response to not authenticating of the NFC-enabled entity.

Figure 6:
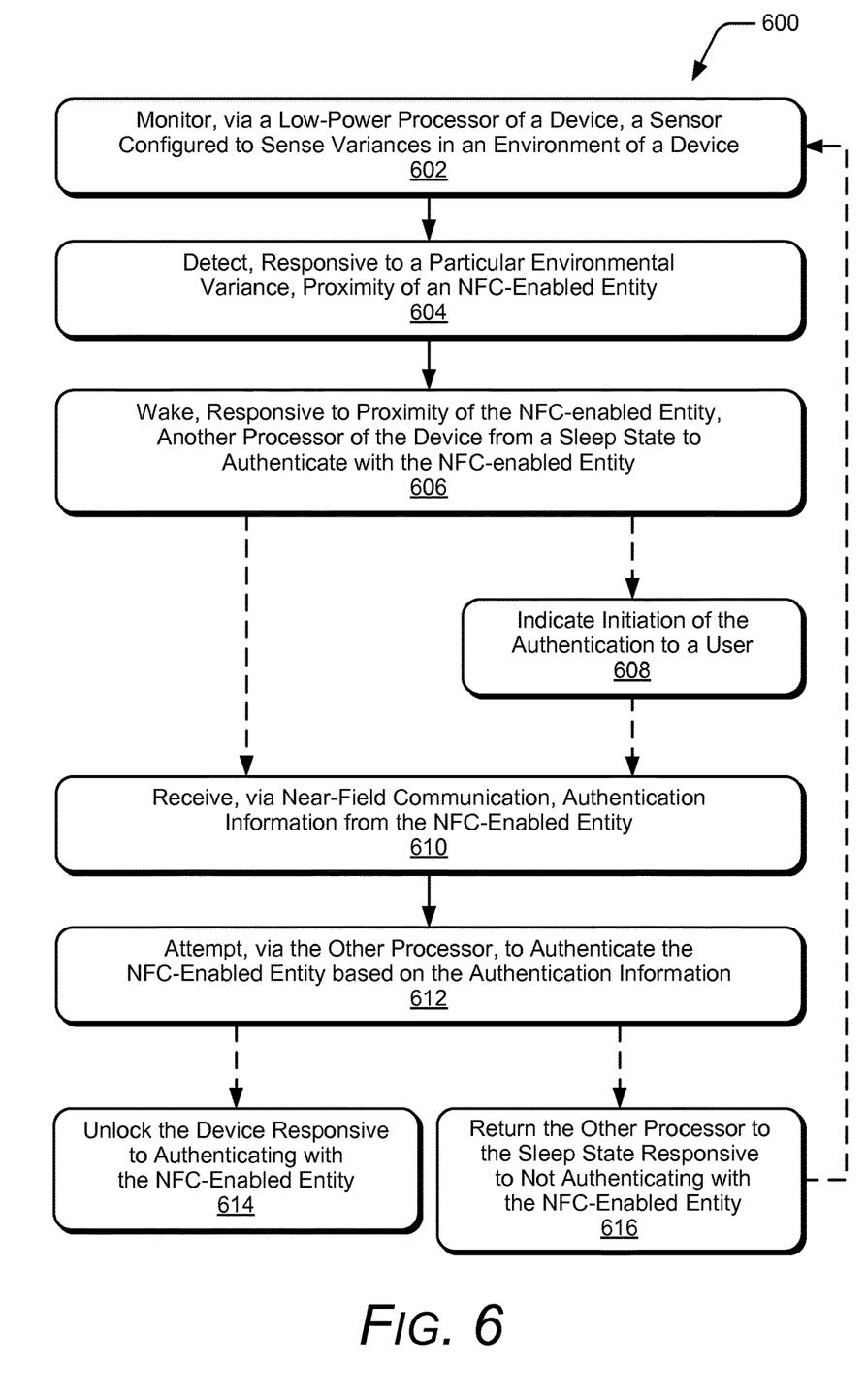
FIG. 6 illustrates example method(s) for authenticating with an NFC-enabled entity using sensor-based NFC authentication.

FIG. 6 illustrates example method(s) 600 for authenticating with an NFC-enabled entity using sensor-based NFC authentication.

At 602, a sensor is monitored via a low-power processor of a computing device for environmental variances or stimuli. The sensor is monitored while the computing device, and other components thereof, are in respective low-power or sleep states. The computing device may also be locked to prevent unauthorized access of user data or functionalities of the computing device. In some cases, the low-power processor is unable to implement functionalities enabled by the other processor, such as authentication and/or communication.

At 604, proximity of an NFC-enabled entity is detected responsive to a particular environmental variance. Proximity with the NFC-enabled entity may be immediate or prospective (i.e., forthcoming, impending, or expected), such as when a user initiates an NFC authentication procedure via the particular environmental variance. The environmental variance may include movement, light, sound, changes in magnetic field characteristics, or any suitable combination thereof.

By way of example only, the environmental variance may include a gesture made with the computing device, a voice-command of a user of the computing device, or a magnetic field change caused by a magnet associated with an NFC authentication accessory of the user. When implemented as an accessory, the NFC-enabled entity is can be embodied as a ring, magnetic snap, token, watch, bracelet, identification card, and the like. Once proximity with the NFC-enabled entity is detected, the NFC-enabled entity may be momentarily "tapped" against the computing device or remain in close proximity for an extended period of time to enable subsequent authentication.

Alternately or additionally, proximity of an NFC-enabled entity can be detected responsive to a wireless transceiver detecting or associating with a known network or another device. For example, detection of a user's Bluetooth™ headset by a Bluetooth™ radio of the computing device can indicate prospective proximity with an NFC-enabled entity also associated with the user.

At 606, another processor of the computing device is woken from a sleep state to authenticate with the NFC-enabled entity. The other processor is woken in response to detection of the NFC-enabled entity. In some cases, the environmental variance is processed or analyzed with the other processor to verify an identify of a user associated with the NFC-enabled entity. This other processor is an application processor or full-featured processor of the computing device that is capable of implementing authentication and communication functionalities of the device. In some cases, the other processor is a DSP subsystem of the computing device that is capable of implementing the authentication and communication functionalities, yet may not be powerful enough to fully wake the device.

Optionally at 608, initiation of an authentication process is indicated to a user of the computing device. The initiation of the authentication may be indicated using any suitable user-perceptible output of the computing device, such as a display, LED indicator, vibrator, speaker, and the like. For example, the computing device may vibrate in a pulsed manner, emit an audio alert, or blink an LED indicator to alert the user of the authentication process. The indication may be effective to preclude the user from having to manually wake the phone to verify authentication status or re-initiate contact with the NFC-enabled entity.

At 610, authentication information is received from the NFC-enabled entity via an NFC communication interface (e.g., NFC transceiver 120). The authentication information may include a unique identification number, serial number of the NFC-enabled entity, previously transmitted random number, cryptographic hash number, or any suitable combination thereof. This authentication information enables subsequent authentication operations to be performed for verifying an identity of the NFC-enabled entity or a user in possession thereof.

At 612, authentication with the NFC-enabled entity is attempted based on the authentication information. The authentication attempt is executed via the other processor of the computing device. This attempt to authenticate can be performed prior to fully waking the computing device, enabling power to be conserved until a determination is made to unlock the device. From operation 612, method 600 proceeds to operation 614 responsive to successfully authenticating with the NFC-enabled device, or proceeds to operation 616 responsive to an unsuccessful attempt to authenticate with the NFC-enabled device.

At 614, the computing device is unlocked in response to authenticating with the NFC-enabled entity. Unlocking the computing device is effective to enable access to user data or functionalities of the computing device that were previously inaccessible. Prior to unlocking, the computing device and other components thereof may be awoken or activated from their respective low-power or sleep states.

At 616, the other processor is returned to a sleep state in response to not authenticating with the NFC-enabled entity. By so doing, power of the computing device is saved until a subsequent attempt of authentication. Alternately or additionally, the failure to authenticate with the NFC-enabled entity may be logged for later analysis. For example, the failure and associated identification information of the NFC-enabled entity may presented when a user unlocks computing device 102 to alert the user of possible attempts by unknown entity to access the device. From operation 616, method 600 returns to operation 602 where the low-power processor resumes monitoring the sensors for environmental variances of stimuli.

Example Electronic Device

Figure 7:
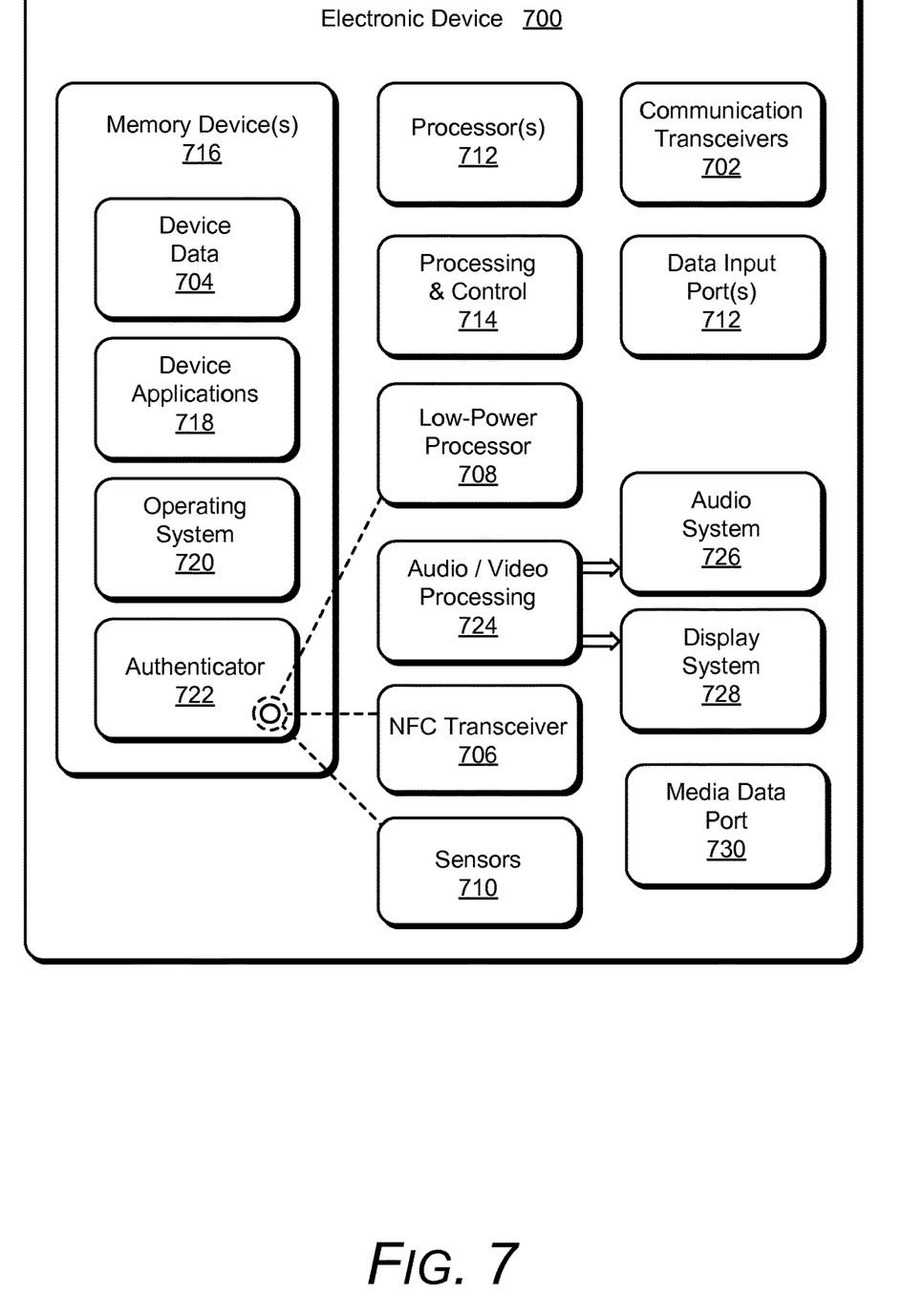
FIG. 7 illustrates various components of an electronic device that can implement techniques for sensor-based NFC authentication.

FIG. 7 illustrates various components of an example electronic device 700 that can be implemented as a computing device as described with reference to any of the previous FIGS. 1-6. The device may be implemented as any one or combination of a fixed or mobile device, in any form of a consumer, computer, portable, user, communication, phone, navigation, gaming, messaging, Web browsing, paging, media playback, and/or other type of electronic device, such as the computing device 102 described with reference to FIG. 1.

Electronic device 700 includes communication transceivers 702 that enable wired and/or wireless communication of device data 704, such as received data and transmitted data. Example communication transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN, 3GPP-compliant) radios for cellular telephony, wireless metropolitan area network (WMAN) radios compliant with various IEEE 802.16 (WiMAX™) standards, and wired local area network (LAN) Ethernet transceivers. Electronic device 700 also includes NFC transceiver 706, such as NFC transceiver 120 as described above, to enable NFC communication with other devices or listener circuits.

In embodiments, the electronic device 700 includes low-power processor 708, such as low-power processor 110 described with reference to FIG. 1. The electronic device 800 may also include sensors 710, such as motion sensor 128, light sensor 130, acoustic sensor 132, and/or magnetic sensor 134 described with reference to FIGS. 1 and 2. The low-power processor 708, NFC transceiver 706, and sensors 710 can be implemented to facilitate sensor-based NFC authentication. For example, when the electronic device 700 enters a sleep or low-power state, low-power processor 708 and sensors 710 can be leveraged to detect, while more-powerful processors and other subsystems of electronic device 700 remain powered-down, environmental variances indicative of other devices with which to authenticate.

Electronic device 700 may also include one or more data input ports 710 via which any type of data, media content, and/or inputs can be received, such as user-selectable inputs, messages, music, television content, recorded video content, and any other type of audio, video, and/or image data received from any content and/or data source. Data input ports 710 may include USB ports, coaxial cable ports, and other serial or parallel connectors (including internal connectors) for flash memory, DVDs, CDs, and the like. These data input ports may be used to couple the electronic device to components, peripherals, or accessories such as keyboards, microphones, or cameras.

Electronic device 700 of this example includes processor system 712 (e.g., any of application processors, microprocessors, digital-signal-processors, controllers, and the like), or a processor and memory system (e.g., implemented in a SoC), which process (i.e., execute) computer-executable instructions to control operation of the device. Processor system 712 (processor(s) 712) may be implemented as an application processor or full-power processor, such as application processor 108 described with reference to FIG. 1. A processing system may be implemented at least partially in hardware, which can include components of an integrated circuit or on-chip system, digital-signal processor (DSP), application-specific integrated circuit (ASIC), field-programmable gate array (FPGA), a complex programmable logic device (CPLD), and other implementations in silicon and/or other hardware. Alternatively or in addition, the electronic device can be implemented with any one or combination of software, hardware, firmware, or fixed logic circuitry that is implemented in connection with processing and control circuits, which are generally identified at 714 (processing and control 714). Although not shown, electronic device 700 can include a system bus, crossbar, or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Electronic device 700 also includes one or more memory devices 716 that enable data storage, examples of which include random access memory (RAM), non-volatile memory (e.g., read-only memory (ROM), flash memory, EPROM, EEPROM, etc.), and a disk storage device. Memory device(s) 716 provide data storage mechanisms to store the device data 704, other types of information and/or data, and various device applications 718 (e.g., software applications). For example, operating system 720 can be maintained as software instructions within memory device 716 and executed by processors 712. In some aspects, authenticator 722 is embodied in memory devices 716 of electronic device 700 as executable instructions or code. Although represented as a software implementation, authenticator 722 may be implemented as any form of a control application, software application, signal-processing and control module, firmware that is installed on the device, a hardware implementation of the controller, and so on.

Electronic device 700 also includes audio and/or video processing system 724 that processes audio data and/or passes through the audio and video data to audio system 726 and/or to display system 728. Audio system 726 and/or display system 728 may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 730. In some implementations, audio system 726 and/or display system 728 are external components to electronic device 700. Alternatively or additionally, display system 728 can be an integrated component of the example electronic device, such as part of an integrated touch interface. As described above, authenticator 722 may use display system 728, or components thereof, in some aspects of sensor-based NFC authentication. For example, when electronic device 700 is in a sleep or low-power state, authenticator 722 may activate display system 728 to indicate initiation of an authentication process to a user while other components of electrical device 700 remain in a low-power state.

Although embodiments of sensor-based NFC authentication have been described in language specific to features and/or methods, the subject of the appended claims is not necessarily limited to the specific features or methods described. Rather, the specific features and methods are disclosed as example implementations of sensor-based NFC authentication.

What is claimed is:

1. A method comprising:
   detecting, via sensors and a low-power processor of a device that is in a sleep state, a combination of two or more environmental variances identifying a user of a near-field communication-enabled (NFC-enabled) entity, the low-power processor having a reduced instruction set and not capable of authenticating the NFC-enabled entity;
   activating, responsive to detecting the combination of two or more environmental variances via the sensors and the low-power processor, an application processor of the device that is capable of authenticating the NFC-enabled entity, the application processor implemented as a component separate and disparate from the low-power processor and having an instruction set greater than that of the low-power processor;
   receiving, via a near-field communication (NFC) interface of the device, authentication information from the NFC-enabled entity; and
   authenticating, via the application processor and based on authentication information, the NFC-enabled entity effective to wake the device from the sleep state.

2. The method as recited in claim 1, wherein the combination of two or more environmental variances are comprised from a gesture, ambient light, a voice command, or a magnetic field.

3. The method as recited in claim 1, wherein the lower-power processor is not capable of communicating via the NFC interface of the device.

4. The method as recited in claim 1, wherein the NFC interface is in a sleep state prior to detecting the combination of two or more environmental variances, and the method further comprises activating the NFC interface to enable communication with the NFC-enabled entity prior to receiving the authentication information.

5. The method as recited in claim 1, further comprising indicating, responsive to detecting the combination of two or more environmental variances, an initiation of the acts of activating, receiving, or authenticating to a user of the device.

6. The method as recited in claim 5, wherein the device includes a display that is powered-down while in the sleep state, and indicating the initiation of the acts of activating, receiving, or authenticating includes powering the display of the device.

7. The method as recited in claim 5, wherein the device includes a light-emitting diode (LED) indicator, speaker, or vibrator, and indicating the initiation of the acts of activating, receiving, or authenticating includes altering a state of the LED indicator, emitting an audio alert via the speaker, or causing actuation of the vibrator.

8. The method as recited in claim 1, wherein the device is locked while in the sleep state prior to detecting the combination of two or more environmental variances, and the method further comprises unlocking the device in response to authenticating the NFC-enabled entity.

9. A device comprising:
   a near-field communication (NFC) transceiver configured to enable wireless communication of data;
   sensors configured to detect environmental variances;
   a low-power processor having a reduced instruction set, the low-power processor configured to monitor the sensors for detection of a combination of two or more environmental variances identifying a user of an NFC-enabled entity and the low-power processor unable to authenticate the NFC-enabled entity; and
   an application processor implemented as a component separate and disparate from the low-power processor, the application processor having an instruction set greater than the low-power processor, having a sleep state in which power of the device is conserved, having an active state in which authentication operations and other functionalities of the device are implemented, and configured to:
   receive, while in the sleep state, a signal from the low-power processor indicating the detection of the combination of two or more environmental variances;
   wake, responsive to the signal, from the sleep state to the active state to implement the authentication operations;
   receive, via the NFC transceiver, authentication information from the NFC-enabled entity;
   attempt to authenticate with the NFC-enabled entity based on the authentication information received via the NFC transceiver; and
   enable access to the other functionalities of the device responsive to successfully authenticating with the NFC-enabled entity.

10. The device as recited in claim 9, wherein the combination of two or more environmental variances are combined from environmental variances generated by a gesture, changes in ambient light, light patterns, a voice, or a magnet associated with the user.

11. The device as recited in claim 9, wherein the device includes a locked state and an unlocked state by which access to the other functionalities of the device are controlled, the device is in the locked state prior to successfully authenticating with the NFC-enabled entity, and the device is transitioned from the locked state to the unlocked state in response to successfully authenticating with the NFC-enabled entity effective to enable access to the other functionalities of the device.

12. The device as recited in claim 11, further comprising a display and wherein the application processor is further configured to indicate, via the display, an initiation of the authentication operations, the locked state of the device, or the unlocked state of the device.

13. A method comprising:
monitoring, via a low-power processor of a device, the low-power processor having a reduced instruction set and in a locked state, a sensor of a device for a coded pulse of visible light;
determining, by the low-power processor and responsive to detecting the coded pulse of visible light, presence of a near-field communication-enabled (NFC-enabled) entity associated with the user;
waking, responsive to the presence of the NFC-enabled entity, an application processor of the device, the application processor implemented as a component separate and disparate from the low-power processor and with an instruction set greater than that of the low-power processor, from a sleep state to authenticate with the NFC-enabled entity;
receiving, via a near-field communication (NFC) interface of the device, authentication information from the NFC-enabled entity;
attempting, via the application processor and based on the authentication information, to authenticate with the NFC-enabled entity; and
unlocking the device responsive to authenticating with the NFC-enabled entity associated with the user; or
returning the application processor to the sleep state responsive to not authenticating with the NFC-enabled entity, the device remaining in the locked state.

14. The method as recited in claim 13, further comprising activating, while the device is in the locked state, a display of the device to indicate an initiation of the attempt to authenticate with the NFC-enabled entity.

15. The method as recited in claim 14, further comprising indicating, via the display of the device, the unlocking of the device in response to authenticating with the NFC-enabled entity.

16. The method as recited in claim 13, further comprising indicating, via a light-emitting diode (LED) indicator, speaker, or vibrator of the device, an initiation of the attempt to authenticate with the NFC-enabled entity.

17. The method as recited in claim 13, wherein the application processor is configured as a multi-core processor.

18. The method as recited in claim 13, wherein the coded pulse of visible light is emitted from a light-emitting accessory such as a ring or bracelet associated with the user of the device.

19. The method as recited in claim 2, wherein the gesture is compared to known user-associated gestures to determine if the user is attempting to initiate an unlock procedure of the device.

20. The method as recited in claim 2, wherein the voice command is compared to known user voice-prints or voice-profiles to determine if the voice command is valid.

* * * * *